US012634026B2

(12) United States Patent
Wang et al.

(10) Patent No.: US 12,634,026 B2
(45) Date of Patent: May 19, 2026

(54) METHOD FOR DESIGNING TIME-DOMAIN NON-STATIONARY V2V MIMO COMMUNICATION CHANNEL EMULATOR

(71) Applicants:Southeast University, Nanjing (CN); PURPLE MOUNTAIN LABORATORIES, Nanjing (CN)

(72) Inventors: Chengxiang Wang, Nanjing (CN); Duoxian Huang, Nanjing (CN); Lijian Xin, Nanjing (CN); Jie Huang, Nanjing (CN)

(73) Assignees: SOUTHEAST UNIVERSITY, Nanjing (CN); PURPLE MOUNTAIN LABORATORIES, Nanjing (CN)

( * ) Notice: Subject to any disclaimer, the term of this patent is extended or adjusted under 35 U.S.C. 154(b) by 0 days.

(21) Appl. No.: 18/815,239

(22) Filed: Aug. 26, 2024

(65) Prior Publication Data
US 2025/0080259 A1     Mar. 6, 2025

(30) Foreign Application Priority Data
Aug. 29, 2023    (CN) .......................... 202311093077.3

(51) Int. Cl.
*H04B 17/391*        (2015.01)
*H04B 7/0426*        (2017.01)
*H04L 25/02*         (2006.01)

(52) U.S. Cl.
CPC ......... *H04B 17/3912* (2015.01); *H04B 7/043* (2013.01); *H04L 25/0212* (2013.01)

(58) Field of Classification Search
CPC ................ H04B 17/3912; H04B 7/043; H04B 17/0087; H04B 7/0413; H04B 17/15; H04B 17/29; H04L 25/0212; Y02D 30/70
See application file for complete search history.

(56) References Cited

U.S. PATENT DOCUMENTS 8,423,340 B2 * 4/2013 Wen ..................... H04B 17/336
                                                    703/13
2022/0029667 A1 * 1/2022 Dhananjay ............... H04B 7/10

* cited by examiner

*Primary Examiner* — Vineeta S Panwalkar
(74) *Attorney, Agent, or Firm* — MUNCY, GEISSLER, OLDS & LOWE, P.C.

(57) ABSTRACT

A method for designing a time-domain non-stationary V2V MIMO communication channel emulator includes determining basic parameters for the V2V MIMO communication channel; generating a V2V 2D time-domain non-stationary communication channel environment, by using a MATLAB, that is, the numbers of the scatterers and the positions of the scatterers and the like; importing parameters generated in the previous step into a hardware simulation platform to calculate communication channel parameters for clusters, such as an angle distribution and a power distribution, writing a Verilog code for running, and eventually calculating to obtain a channel impulse response of the time-domain non-stationary V2V MIMO communication channel; and comparing with a statistical characteristic of a theoretical communication channel model, and designing an appropriate hardware diagram of a communication channel emulator. The method supports the simulation of time-domain non-stationary V2V MIMO communication channel, filling the gap in the field of communication channel emulators.

5 Claims, 6 Drawing Sheets

METHOD FOR DESIGNING TIME-DOMAIN NON-STATIONARY V2V MIMO COMMUNICATION CHANNEL EMULATOR

TECHNICAL FIELD

The present disclosure relates to the technical field of channel modeling and channel emulators, and especially relates to a method for designing an a time-domain non-stationary vehicle-to-vehicle (V2V) multiple-input multiple-output (MIMO) communication channel emulator.

BACKGROUND

Before a new communication system be commercialized, the new communication system needs to be practically tested in a corresponding environment. Although the system can be tested on-site in different locations, this method has a relative high cost and is easy to be influenced by surrounding environment. In addition, propagation conditions of a real external field are difficult to be reproduced by comparative analyses of simulation results. A more practical method is to create suitable and stable simulation environments for channels, and then evaluate performances of the communication system in these environments. The channel environments can be controllably and repeatably simulated by channel emulators, which is used for a consistency testing, a performance testing, and an interoperability testing of communication systems. This means that there is no need for an on-site testing, and efficiencies of time and cost can be greatly improved. At present, there is no emulator for a time-domain non-stationary V2V communication channel that supports a birth-death process of clusters and considers macro cells, micro cells, and micro-micro cells.

In summary, it is necessary to establish a method for designing a time-domain non-stationary V2V MIMO communication channel emulator.

SUMMARY

In view of this, the objectives of the present disclosure are to provide a method for designing the time-domain non-stationary V2V MIMO communication channel emulator, so as to accurately and stably test a V2V MIMO communication system.

In order to achieve above objectives, the technical solutions adopted by the present disclosure are as follows.

A method for designing a time-domain non-stationary V2V MIMO communication channel emulator is provided. The method includes the following steps.

In Step S1, the basic parameters for the V2V MIMO communication channel are determined.

In Step S2, a V2V two-dimensional (2D) time-domain non-stationary communication channel environment is generated by using a MATLAB, and the environment specifically includes the number of scatterers and positions of the scatterers, a random phase of a non-line-of-sight (NLoS) path, an angle spread of the NLoS path, a sine function lookup table, and an arctangent function lookup table.

In Step S3, parameters generated in Step S2 are imported into a hardware simulation platform to calculate communication channel parameters for the clusters, and the communication channel parameters include an angle distribution and an amplitude distribution, a Verilog code is written for running, and a channel impulse response of the time-domain non-stationary V2V MIMO communication channel is eventually obtained by calculation.

In Step S4, a comparison is performed with a statistical characteristic of a theoretical communication channel model, and an appropriate hardware diagram of a communication channel emulator is designed.

Preferably, in Step S1, in a geometry-based stochastic model for the time-domain non-stationary V2V MIMO communication channel, the basic parameters for the V2V MIMO communication channel include the number of a simulation time point, a simulation time interval, a position of a transmitter, a position of a receiver, a velocity of the transmitter, a velocity of the receiver, a Rice factor, an angle spread coefficient, a total link power, a line-of-sight (LoS) path, a power ratio of a single-bounce (SB) path, a power ratio of a double-bounce (DB) path, the number of initial scatterers, a velocity of the initial scatterers, the number of sub-paths in each cluster, a generation rate for scatterers, a disappearance rate for the scatterers, a motion ratio of the scatterers, a relative coordinate of a receiver antenna and a relative coordinate of a transmitter antenna.

Preferably, Step S2 specifically includes as follows.

In Step S201, the numbers of the scatterers and the positions of the scatterers are generated, and an average survival probability $P_{remain}$ of effective scatterers within a time period $\Delta t$ is expressed as $$P_{remain} = \exp\{-\gamma_R[P_m(\|\vec{v}_{S_1}\| + \|\vec{v}_{S_2}\|)\Delta t + \|\vec{v}_{Rx} - \vec{v}_{Tx}\|\Delta t]\},$$

where $\gamma_R$ denotes a generation rate of the scatterers, $P_m$ denotes a motion percentage, $\vec{v}_{s_1}$ and $\vec{v}_{s_2}$ denote an average velocity of scatterer $S_1$ and an average velocity of scatterer $S_2$, respectively. $\vec{v}_{Tx}$ and $\vec{v}_{Rx}$ denote a velocity of the transmitter and a velocity of the receiver, respectively.

A probability function $P(N_{new}(\Delta t)=k)$ of the number of newly generated scatterers is expressed as $$P(N_{new}(\Delta t) = k) = \frac{\lambda^k}{k!}e^{-\lambda}, k = 0, 1, \ldots, \text{ and}$$

$$\lambda = \frac{\gamma_G}{\gamma_R}(1 - P_{remain})$$

where $\lambda$ denotes a parameter for a Poisson distribution probability distribution function; and $\gamma_G$ denotes a disappearance rate of the scatterers, k denotes a parameter; then, an average number of the scatterers $E\{N(t)\}$ is:

$$E\{N(t)\} = \frac{\gamma_G}{\gamma_R}.$$

Eventually, the numbers of the scatterers within each time period $\Delta t$ are obtained by calculation, which are generated through a MATLAB, and are sequentially stored in a file with a coe suffix.

Position coordinates of the scatterers are uniformly and randomly generated in a rectangular area around the receiver and the transmitter, which are generated through the MATLAB, and are sequentially stored in the file with a coe suffix.

In Step S202, the random phase of a NLoS path is generated, and the random phase of a NLoS path follows a uniform distribution in $[-\pi, \pi)$, which are generated through the MATLAB, and are sequentially stored in the file with a coe suffix.

In Step S203, the angle spread of the NLoS path is generated, whose calculation formula is expressed as $$\varphi_{AoD}^m(t) = AS(\theta_{AoD})Y_{AoD}^m,$$

$$\varphi_{AoA}^m(t) = AS(\theta_{AoA})Y_{AoA}^m,$$

where $$\varphi_{AoD}^m(t) \text{ and } \varphi_{AoA}^m(t)$$

denote an angle spread of an angle of departure (AoD) and an angle spread of an angle of arrival (AoA), respectively, $AS(\theta_{AoD})$ and $AS(\theta_{AoA})$ denote an angle spread coefficient for the AoD and an angle spread coefficient for the AoA, respectively, and $$Y_{AoD}^m \text{ and } Y_{AoA}^m$$

follow a standard normal distribution N(0,1), respectively. The angle spread of the AD and the angle spread of the AoA are generated through the MATLAB, and are sequentially stored in the file with a coe suffix.

In Step S204, the sine function lookup table is generated, and 65536 points are uniformly sampled within one cycle to be symmetric about a y-axis, and function values are amplified to 4096 times, which are generated through the MAT-LAB, and are sequentially stored in the file with a coe suffix.

In Step S205, the arctangent function lookup table is generated, and 524288 points are uniformly sampled around an origin point with an interval 1/65536 between each sampling point to be symmetric about the y-axis, and function values are amplified to $2^{15}/\pi$ times, which are generated through the MATLAB, and are sequentially stored in the file with a coe suffix.

Preferably, in Step S3, the angle distributions of the clusters are expressed as $$\theta_{AoD}^{LoS}(t), \theta_{AoA}^{LoS}(t), \theta_{AoD}^{i,n}(t) \text{ and } \theta_{AoA}^{i,n}(t),$$

the amplitude distribution is expressed as $$H_{qp}^{LoS}(t), H_{qp}^{SB_i}(t) \text{ and } H_{qp}^{DB}(t);$$

an angle of the clusters is determined by the coordinate of the transmitter, the coordinate of the receiver, and the coordinates of the scatterers; the amplitude is determined by the Rice factor, the total power, a proportion of a SB ray and a DB ray to a total scattering power on the NLoS path, the number of an i-th class scatterers at a time instant t, and the number of sub-paths in each cluster of the NLoS path, and Step S3 specifically includes the following steps.

In Step S301, the AD of all paths and the AoA of all paths are generated, whose calculation formulas are expressed as $$\theta_{AoD}^{LoS}(t) = \arctan\frac{Rx^y(t) - Tx^y(t)}{Rx^x(t) - Tx^x(t)},$$

-continued $$\theta_{AoA}^{LoS}(t) = \arctan\frac{Tx^y(t) - Rx^y(t)}{Tx^x(t) - Rx^x(t)},$$

$$\theta_{AoD}^{i,n}(t) = \arctan\frac{S_i^y(t) - Rx^y(t)}{S_{i,n}^x(t) - Rx^x(t)},$$

$$\theta_{AoA}^{i,n}(t) = \arctan\frac{S_i^y(t) - Rx^y(t)}{S_{i,n}^x(t) - Rx^x(t)},$$

where $$S_{i,n}^x(t), Tx^x(t) \text{ and } Rx^x(t)$$

denote a horizontal coordinate of the n-th scatterer in the i-th class (i=1,2,3), a horizontal coordinate of the transmitter, and a horizontal coordinate of the receiver, respectively, and $$S_{i,n}^y(t), Tx^y(t) \text{ and } Rx^y(t)$$

denote a vertical coordinate of the n-th scatterer in the i-th class, a vertical coordinate of the transmitter, and a vertical coordinate of the receiver, respectively.

In Step S302, a sub-path angle of the NLoS path is generated, whose calculation formulas are expressed as $$\theta_{AoD}^{i,n,m}(t) = \varphi_{AoD}^m(t) + \theta_{AoD}^{i,n},$$

$$\theta_{AoA}^{i,n,m}(t) = \varphi_{AoA}^m(t) + \theta_{AoA}^{i,n},$$

where $$\theta_{AoD}^{i,n,m}(t) \text{ and } \theta_{AoA}^{i,n,m}(t)$$

denote an AoD of the m-th sub-path and an AoA of the m-th sub-path, respectively, $$\varphi_{AoD}^m(t) \text{ and } \varphi_{AoA}^m(t)$$

denote an angle spread value for the AoD of the m-th sub-path and an angle spread value for the AoA of the m-th sub-path, respectively, and $$\theta_{AoD}^{i,n} \text{ and } \theta_{AoA}^{i,n}$$

denote an average value for the AoDs of clusters passing through the n-th scatterer in the i-th class and an average value for the AoAs of the clusters passing through the n-th scatterer in the i-th class, respectively.

In Step S303, a time delay value is generated, whose calculation formula is expressed as $$\tau^{LoS}(t) = \frac{\sqrt{[Rx^x(t) - Tx^x(t)]^2 + [Rx^y(t) - Tx^y(t)]^2}}{c}$$

-continued $$\tau_n^{SB_i}(t) = \frac{\sqrt{\begin{array}{l}[S_{i,n}^x(t) - Tx^x(t)]^2 + [S_{i,n}^y(t) - Tx^y(t)]^2 + \\ [S_{i,n}^x(t) - Rx^x(t)]^2 + [S_{i,n}^y(t) - Rx^y(t)]^2\end{array}}}{c}$$

$$\tau_{n_1,n_2}^{DB}(t) = \frac{\sqrt{\begin{array}{l}[S_{1,n}^x(t) - Tx^x(t)]^2 + [S_{1,n}^y(t) - Tx^y(t)]^2 + [S_{1,n}^x(t) - S_{2,n}^x(t)]^2 + \\ [S_{1,n}^y(t) - S_{2,n}^y(t)]^2 + [S_{2,n}^x(t) - Rx^x(t)]^2 + [S_{2,n}^y(t) - Rx^y(t)]^2\end{array}}}{c}$$

where, $\tau^{LoS}$(t)denotes a time delay value for a LoS path, $$\tau_n^{SB_i}(t)$$

denotes a time delay value for a SB path cluster passing through the n-th scatterer in the i-th class, $$\tau_{n_1,n_2}^{DB}(t)$$

denotes a time delay value for a DB path cluster passing through the $n_1$-th scatterer in the first class and the $n_2$-th scatterer in the second class, and c denotes a velocity of light.

In Step S304, Doppler phase values $$\phi^{LoS}(t), \phi_{n,m}^{SB_i}(t) \text{ and } \phi_{n_1,n_2,m}^{DB}(t)$$

are generated, whose calculation formulas are expressed as $$f^{LoS}(t) = f_c\left(\frac{\vec{v}_{Tx}^T \hat{r}_{Tx}^{LoS}(t)}{c} + \frac{\vec{v}_{Rx}^T \hat{r}_{Rx}^{LoS}(t)}{c}\right),$$

where $f^{LoS}$(t) denotes a Doppler frequency of the LoS path, $f_c$ denotes a carrier frequency; and $$\hat{r}_{Tx}^{LoS}(t) = \left(\cos\theta_{AoD}^{LoS}(t), \sin\theta_{AoD}^{LoS}(t)\right)$$

where $$\hat{r}_{Rx}^{LoS}(t) = \left(\cos\theta_{AoA}^{Los}(t), \sin\theta_{AoA}^{Los}(t)\right)$$

$$\phi^{LoS}(t) = \int_{t_0}^t 2\pi f^{LoS}(t')dt',$$

where $$\hat{r}_{Tx}^{LoS}(t) \text{ and } \hat{r}_{Rx}^{LoS}(t)$$

denote a unit vector for the AoD of the LoS path and a unit vector for the AoA of the LoS path, respectively, and $\phi^{LoS}$(t) denotes a Doppler phase of the LoS path; and $$f_{n,m}^{SB_i}(t) = f_c\left(\frac{\vec{v}_{n_i,Tx}^T \hat{r}_{Tx,n,m}^{SB}(t)}{c} + \frac{\vec{v}_{n_i,Rx}^T \hat{r}_{Rx,n,m}^{SB}(t)}{c}\right),$$

$$f_{n,m}^{SB_i}(t)$$

denotes a Doppler frequency of the m-th sub-path of the SB path passing through the n-th scatterer in the i-th class, and $$\vec{v}_{n_i,Tx} = \vec{v}_{Tx} - \vec{v}_{n_i}$$

$$\vec{v}_{n_i,Rx} = \vec{v}_{Rx} - \vec{v}_{n_i}$$

$$\hat{r}_{Tx,n,m}^{SB_i}(t) = \left(\cos\theta_{AoD}^{i,n,m}(t), \sin\theta_{AoD}^{i,n,m}(t)\right)$$

$$\hat{r}_{Rx,n,m}^{SB_i}(t) = \left(\cos\theta_{AoA}^{i,n,m}(t), \sin\theta_{AoA}^{i,n,m}(t)\right)$$

$$\phi_{n,m}^{SB_i}(t) = \int_{t_0}^t 2\pi f_{n,m}^{SB_i}(t')dt',$$

where $\vec{v}_{n_i,Tx}$ and $\vec{v}_{n_i,Rx}$ denote a relative velocity of the transmitter with the n-th scatterer and a relative velocity of the receiver with the n-th scatterer, respectively;

$$\hat{r}_{Tx,n,m}^{SB_i}(t) \text{ and } \hat{r}_{Rx,n,m}^{SB_i}(t)$$

denote a unit vector for an AoD of the m-th sub-path of the SB path passing through the n-th scatterer in the i-th class, and a unit vector for an AoA of the m-th sub-path of the SB path passing through the n-th scatterer in the i-th class, respectively, and $$\phi_{n,m}^{SB_i}(t)$$

denotes a Doppler phase of the m-th sub-path of the SB path passing through the n-th scatterer in the i-th class;

$$f_{n_1,n_2,m}^{DB}(t) = f_c\left(\frac{\vec{v}_{n_1,Tx}^T \hat{r}_{Tx,n_1,m}^{DB}(t)}{c} + \frac{\vec{v}_{n_2,Rx}^T \hat{r}_{Rx,n_2,m}^{DB}(t)}{c}\right),$$

where $$f_{n_1,n_2,m}^{DB}(t)$$

denotes a Doppler frequency of the moth sub-path of the DB path passing through the $n_1$-th scatterer in the first class and the $n_2$-th scatterer in the second class; and $$\vec{v}_{n_1,Tx} = \vec{v}_{Tx} - \vec{v}_{n_1}$$

$$\vec{v}_{n_2,Rx} = \vec{v}_{Rx} - \vec{v}_{n_2}$$

$$\hat{r}_{Tx,n_1,m}^{DB}(t) = \left(\cos\theta_{AoD}^{1,n_1,m}(t), \sin\theta_{AoD}^{1,n_1,m}(t)\right)$$

-continued $$\hat{r}_{Rx,n_2,m}^{DB}(t) = \left( \cos \theta_{AoA}^{2,n_2,m}(t), \sin \theta_{AoA}^{2,n_2,m}(t) \right)$$

$$\phi_{n_1,n_2,m}^{DB}(t) = \int_{t_0}^{t} 2\pi f_{n_1,n_2,m}^{DB}(t')dt',$$

where $$\hat{r}_{Tx,n_1,m}^{DB}(t), \text{ and } \hat{r}_{Rx,n_2,m}^{DB}(t)$$

denote a unit vector for an AoD of the m-th sub-path of a cluster of the DB path passing through the $n_1$-th scatterer in the first class and the $n_2$-th scatterer in the second class, and a unit vector for an AoA of the m-th sub-path of the cluster of the DB path passing through the $n_1$-th scatterer in the first class and the $n_2$-th scatterer in the second class, respectively, and $$\phi_{n_1,n_2,m}^{DB}(t)$$

denotes a Doppler phase of the m-th sub-path of the cluster of the DB path cluster passing through the $n_1$-th scatterer in the first class and the $n_2$-th scatterer in the second class.

In Step S305, an antenna phase value is generated, whose calculation formula is expressed as follows.

A relative coordinate $$\vec{d}_{Tx}$$

of a transmitter antenna is:

$$\vec{d}_{Tx} = [d_{Tx}^x, d_{Tx}^y]^T,$$

where $$d_{Tx}^x$$

denotes a horizontal ordinate of $$\vec{d}_{Tx} \text{ and } d_{Tx}^y$$

denotes a vertical ordinate of $\vec{d}_{Tx}$.

A phase difference $\psi_{Tx}(t)$ of the transmitter antenna is:

$$\psi_{Tx}(t) = 2\pi f_c \frac{\hat{r}_{Tx}^T(t) \cdot \vec{d}_{Tx}}{c},$$

where $\hat{r}_{Tx}(t)$ denotes a unit vector for an AoD at the time instant t.

A relative coordinate $$\vec{d}_{Rx}$$

of the receiver antenna i:

$$\vec{d}_{Rx} = [d_{Rx}^x, d_{Rx}^y]^T,$$

where $$d_{Rx}^x$$

denotes a horizontal ordinate of $$\vec{d}_{Rx}, d_{Rx}^y$$

denotes a vertical ordinate of $\vec{d}_{Rx}$.

A phase difference $\psi_{Rx}(t)$ of the receiver antenna is:

$$\psi_{Rx}(t) = 2\pi f_c \frac{\hat{r}_{Rx}^T(t) \cdot \vec{d}_{Rx}}{c},$$

where $\hat{r}_{Rx}(t)$ denotes a unit vector for an AoA at the time instant t.

A total antenna phase value $\psi(t)$ is:

$$\psi(t) = \psi_{Tx}(t) + \psi_{Rx}(t).$$

In Step S306, amplitude values are generated, whose calculation formulas are expressed as:

$$H^{LoS}(t) = \sqrt{\frac{K_{qp}P_{qp}}{K_{qp}+1}}$$

$$H^{SB_i}(t) = \sqrt{\frac{\xi_{SB_i}P_{qp}}{(K_{qp}+1)N_i(t)M}}$$

$$H_{qp}^{DB}(t) = \sqrt{\frac{\xi_{DB}P_{qp}}{(K_{qp}+1)N_1(t)N_2(t)M}},$$

where, $$H_{qp}^{LoS}(t)$$

denotes a channel impulse response amplitude value for a LoS path between the q-th receiving antenna and the p-th transmitting antenna, $$H_{qp}^{SB_i}(t)$$

denotes a channel impulse response amplitude value for a sub-path of a SB path passing through the scatterer in the i-th class located between the q-th receiving antenna and the p-th transmitting antenna, $$H_{qp}^{DB}(t)$$

denotes a channel impulse response amplitude value for the sub-path of the DB path between the q-th receiving antenna and the p-th transmitting antenna, $K_{qp}$ denotes a Rice factor of a p-q link, $P_{qp}$ denotes a total power of the p-q link, $\xi_{SB_i}$ and $\xi_{SB_i}$ denote the proportion of the total scattering power of the SB ray and the DB ray on the NLoS path, respectively, $N_i(t)$ denotes the number of the scatterer in the i-th class at the time instant t, and M denotes the number of the sub-paths in each cluster of the NLoS path.

In Step S307, channel impulse response is generated, whose calculation formula is expressed as:

$$h_{qp}^{LoS}(t, \tau) = H^{LoS}(t)e^{-j2\pi f_c \tau^{LoS}(t)}e^{j\phi^{LoS}(t)}e^{j\psi^{LoS}(t)}\delta(\tau - \tau^{LoS}(t))$$

$$h_{qp}^{SB}(t, \tau) = \sum_{i=1}^{3}\sum_{n_i=1}^{N_i(t)} H^{SB_i}(t)e^{-j2\pi f_c \tau_n^{SB_i}(t)}e^{j\varphi_{n,m}^{SB_i}(t)}e^{j\phi_{n,m}^{SB_i}(t)}e^{j\psi_{n,m}^{SB_i}(t)}\delta(\tau - \tau_n^{SB_i}(t))$$

$$h_{qp}^{DB}(t, \tau) = \sum_{n_1,n_2=1}^{N_1(t),N_2(t)} H_{n_1,n_2,m}^{DB}(t)$$

$$e^{-j2\pi f_c \tau_{n_1,n_2}^{DB}}e^{j\varphi_{n_1,n_2,m}^{DB}(t)}e^{j\phi_{n_1,n_2,m}^{DB}(t)}e^{j\psi_{n_1,n_2,m}^{DB}(t)}\delta(\tau - \tau_{n_1,n_2}^{DB_i}(t))$$

$$h_{qp}(t, \tau) = h_{qp}^{LoS}(t, \tau) + h_{qp}^{SB}(t, \tau) + h_{qp}^{DB}(t, \tau),$$

where $$h_{qp}^{LoS}(t, \tau)$$

denotes a channel impulse response for the LoS path between the q-th receiving antenna and the p-th transmitting antenna, $$h_{qp}^{SB}(t, \tau)$$

denotes the channel impulse response for the SB path between the q-th receiving antenna and the p-th transmitting antenna, $$h_{qp}^{DB}(t, \tau)$$

denotes a channel impulse response for the DB path between the q-th receiving antenna and the p-th transmitting antenna, $f_c$ denotes a carrier center frequency, $\tau$ denotes a time delay, $\phi$ denotes a Doppler phase, $\psi$ denotes an antenna phase difference, $$\varphi_{n,m}^{SB_i}(t)$$

and $$\varphi_{n_1,n_2,m}^{DB}(t)$$

denote a random phase of the m-th SB sub-path passing through the n-th scatterer in the i-th class and a random phase of the m-th SB sub-path passing through the $n_1$-th scatterer in the first class and the $n_2$-th scatterer in the second class, respectively; the channel impulse response is imported from the file with a coe suffix and a calculated channel impulse response is exported to a txt file.

Preferably, in Step S4, formulas for the statistical characteristic specifically include followings:

In Step S401, a calculation formula of a time autocorrelation function TACF curve is expressed as:

$$r_{qp,q'p'} = E\{h_{qp}(t, \tau)[h_{q'p'}(t, \tau)]^*\},$$

where $h_{qp}(t,\tau)$ denotes a channel impulse response between the q-th receiving antenna and the p-th transmitting antenna in a case where a time period is t and a time delay is $\tau$, $h_{q'p'}(t,\tau)$ denotes a channel impulse response between the q'-th receiving antenna and the p'-th transmitting antenna in a case where a time period is t and a time delay is $\tau$; $(\cdot)^*$ denotes a conjugate complex of$(\cdot)$ In Step S402, a calculation formula of a spatial cross-correlation function(SCCF) curve is expressed as $$r_{qp}(\Delta t) = E\{h_{qp}(t, \tau)[h_{qp}(t + \Delta t, \tau)]^*\}.$$

In Step S403, a calculation formula of a delay power spectral density(PSD)curve is expressed as $$\rho(\tau, \theta_{AoA}^{i,n}) = \|h_{qp}(t, \tau)\|^2\big|_{\theta_{AoA}^{i,n}}.$$

$K_{qp}$, $\xi_{SB_i}$; and $\xi_{DB}$ in the model are related to the macro cells, the micro cells, and the micro micro cells, as well as a SB path and a DB path. The model proposed by the present disclosure can adapt to various V2V propagation environments by adjusting the model parameters $\xi_{SB_i}$, $\xi_{DB}$, and the Rice factor $K_{qp}$. In the macro cell scenarios, due to a relative large distance between the transmitter and the receiver, the DB rays carry more energy than that of the SB rays(the relative large distance between the transmitter and the receiver leads to a greater independence of an AoD and an AoA, that is, $\xi_{DB} > \max\{\xi_{SB_1}, \xi_{SB_2}\} >> \xi_{SB_3}$, and the received signal power mainly comes from the SB rays and the DB rays of the dual loop model. Therefore, the Rice factor $K_{qp}$ and the energy parameter $\xi_{SB_3}$ are extremely little, even close to zero. This means that in the macro cell scenario, it can be characterized by using a dual loop model that ignores the LoS radial component. Compared with the macro cell scenario, in the micro cell scenario and the micro-micro cell scenario, vehicular traffic density (VTD)significantly affects the channel characteristics. In consideration of the impacts of VTD on channel statistics, the present disclosure distinguishes the mobile cars and the stationary roadside environments(such as buildings, trees, parked cars, etc.)around the transmitter and the receiver. Therefore, the present disclosure simulates a mobile car by using a dual loop model and describes a stationary roadside environment by using an elliptical model. For low VTD, since the LoS path has a high power, the value for $K_{qp}$ is large. In addition, the received scattering power mainly comes from the signal reflected by the stationary roadside environment described by the scatterers freely located on the ellipse. Since the mobile car represented by the scatterers located on the dual loop is sparse, it is more likely to be a SB rather than a DB, indicating a validity of $\xi_{SB_3}>\max\{\xi_{SB_1}, \xi_{SB_2}\}>\xi_{DB}$. Under a condition of a high VTD, the value for $K_{qp}$ is smaller than that in a low VTD scenario, and due to the relative large number of the mobile cars, the DB rays of the dual loop model carry more energy than those of the SB rays of the dual loop model and the elliptical model, that is, $\xi_{DB}>\max\{\xi_{SB_1}, \xi_{SB_2}, \xi_{SB_3}\}$. Thus, the micro cell scenario and the micro-micro cell scenario in consideration of VTD can be well characterized by utilizing the combined dual loop model and the elliptical model with a LoS radial component.

The beneficial effects of the present disclosure are in the following.

The present disclosure can provide a method for designing a time-domain non-stationary V2V MIMO communication channel emulator, so as to accurately and stably test a V2V MIMO communication system.

MHZ, $K_{qp}$=1, $\xi_{SB_i}$=0.2, i=1, 2, 3, $\xi_{DB}$=0.4, $P_{qp}$=30 dBm, M=8, $\vec{v}_{Tx}$=(10,0), $\vec{v}_{Rx}$=(5,0)and $\vec{v}_{S_{1(2)}}$=(1,0), $\gamma_G$=0.08/m, $\gamma_R$=0.03/m, and $P_m$=0.6.

DETAILED DESCRIPTION OF THE EMBODIMENTS

In order to clarify the objectives, the technical solutions, and the advantages of the embodiments of the present disclosure to be clearer, the technical solutions in the embodiments of present disclosure will be clearly and completely described in conjunction with the accompanying drawings. Obviously, the described embodiments are one part of the embodiments of the present disclosure, not all of them. Based on the embodiments in the present disclosure, all other embodiments obtained by a person skilled in the art without creative labor fall within the protection scope of the present disclosure.

Embodiment 1

With reference to FIGS. 1 to 8, provided in this embodiment is a method for designing a time-domain non-stationary V2V MIMO communication channel emulator. The method for designing the communication channel emulator specifically includes the following steps.

In Step S1, basic parameters for the V2V MIMO communication channel are determined.

Specifically, in this embodiment, c a method for establishing a geometry-based stochastic channel model (GBSM). Firstly, the application scenario is determined as V2V, and the initial coordinates of the transmitter and the receivers are determined as (8,8) and (50,50) at the same time. The carrier center frequency is set as 500 MHz, the antenna spacing distance between the transmitter and the receiver is set as 1 meter, the elevation angle and the horizontal angle of the transmitting antenna array and the receiving antenna array are set as 0 and 0, the motion velocity of the transmitter and the motion velocity of the receiver are set as 10 m/s and 5 m/s, respectively, and the direction of the motion is that the elevation angle is 0 and the horizontal angle is 0. $K_{qp}$=1, $\xi_{SB_i}$=0.2, i=1,2,3, $\xi_{DB}$=0.4, $P_{qp}$=30 dBm, and the number of the sub-paths in each cluster is 8. Non isotropic omnidirectional antenna is adopted by both the transmitting antenna and the receiving antenna.

In Step S2, a V2V 2D time-domain non-stationary communication channel environment is generated by using a MATLAB, and the environment specifically includes the number of scatterers and positions of the scatterers, a random phase of a NLoS path, an angle spread of the NLoS path, a sine function lookup table, and an arctangent function lookup table.

Figure 1:
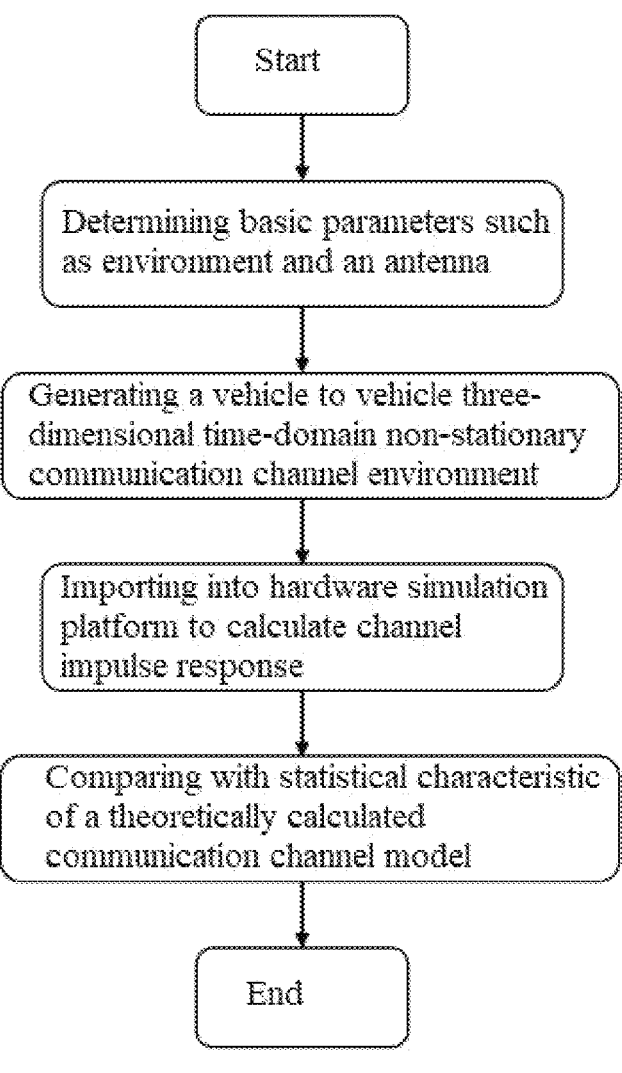
FIG. 1 illustrates a flow chart diagram of a method for designing a time-domain non-stationary V2V MIMO communication channel emulator provided in Embodiment 1 of the present disclosure.
Figure 2:
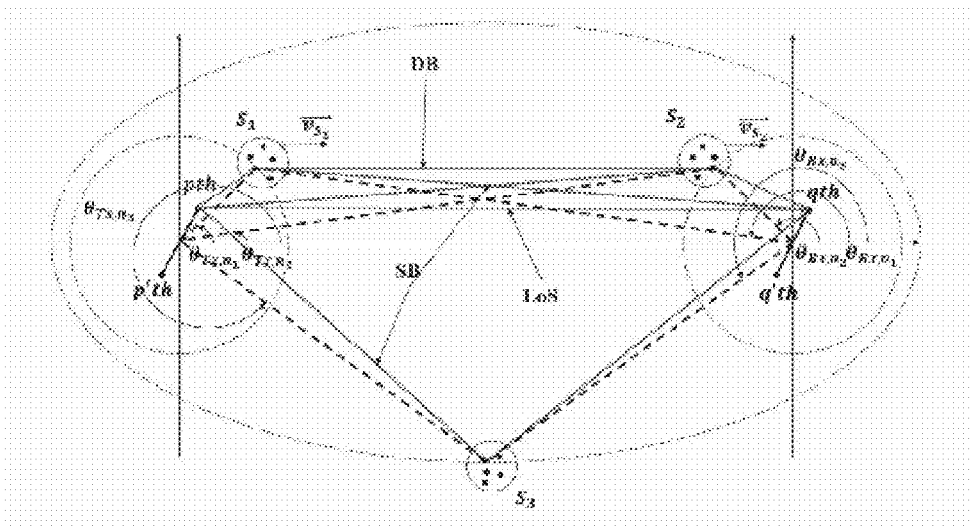
FIG. 2 illustrates a schematic diagram of a geometric stochasticity-based model for the time-domain non-stationary V2V MIMO communication channel provided in Embodiment 1 of the present disclosure.

Specifically, in this embodiment, the V2V communication channel model is adopted in the model, and the schematic diagram of the specific communication channel model is illustrated in FIG. 2.

A uniform linear array is adopted at the antenna terminal, which can be placed arbitrarily in a 2D space. For simplicity, only one cluster in each of LoS path, SB path, and DB path is shown in the drawings. Three classes of the scatterers are located on a circle with the transmitter as the center, a circle with the receiver as the center, and an ellipse representing the street environment, respectively, and only one scatterer of all three classes of the scatterers is shown in the drawings. $\vec{v}_{S_{1(2)}}$ denotes a motion velocity of scatterer in the $1^{st}(2^{nd})$ class.

More specifically, in this embodiment, generating a V2V 2D time-domain non-stationary communication channel environment specifically includes the following steps.

In Step S201, the numbers of the scatterers and positions of the scatterers are generated.

An average survival probability of effective scatterers within the time period $\Delta t$ is expressed as $$P_{remain} = \exp\{-\gamma_R[P_m(\|\vec{v}_{S_1}\| + \|\vec{v}_{S_2}\|)\Delta t + \|\vec{v}_{Rx} - \vec{v}_{Tx}\|\Delta t]\},$$

where $\gamma_R$ denotes a generation rate of the scatterers, $P_m$ denotes a motion percentage, $\vec{v}_{S_1}$ and $\vec{v}_{S_2}$ denote an average velocity of the scatterers $S_1$ and an average velocity of $S_2$, respectively. $\vec{v}_{Tx}$ and $\vec{v}_{Rx}$ denote a velocity of the transmitter and a velocity of the receiver, respectively. A probability function $N_{new}(\Delta t)$ of the number of newly generated scatterers is expressed as $$P(N_{new}(\Delta t) = k) = \frac{\lambda^k}{k!}e^{-\lambda},$$

$$k = 0, 1, \dots ,$$

and $$\lambda = \frac{\gamma_G}{\gamma_R}(1 - P_{remain})$$

where $\lambda$ denotes a parameter for a Poisson distribution probability distribution function; and $\gamma_G$ denotes a disappearance rate of the scatterers. By combining the above two formulas, the average number of scatterers can be obtained:

$$E\{N(t)\} = N(t - \Delta t)P_{remain} + E\{N_{new}(\Delta t)\} = \frac{\gamma_G}{\gamma_R}.$$

Eventually, the numbers of the scatterers within each time period are obtained by calculation, which are generated through a MATLAB, and are sequentially stored in a file with a coe suffix. Position coordinates of the scatterers are uniformly and randomly generated in a rectangular area around the receiver and the transmitter, which are generated through the MATLAB, and are sequentially stored in the file with a coe suffix.

In Step S202, the random phase of a NLoS path is generated.

The random phase of a NLoS path follows a uniform distribution in $[-\pi,\pi)$, which are generated through the MATLAB, and are sequentially stored in the file with a coe suffix.

In Step S203, the angle spread of the NLoS path is generated.

Calculation formula of the angle spread of the NLoS path is expressed as $$\varphi_{AoD}^m(t) = AS(\theta_{AoD})Y_{AoD}^m,$$

$$\varphi_{AoA}^m(t) = AS(\theta_{AoA})Y_{AoA}^m,$$

where $AS(\theta_{AoD})$ and $AS(\theta_{AoA})$ denote an angle spread coefficient for the AoD and an angle spread coefficient for the AoA, respectively, and $$Y_{AoD}^m \text{ and } Y_{AoA}^m$$

follow a standard normal distribution N(0,1), respectively, which are generated through the MATLAB, and are sequentially stored in the file with a coe suffix.

In Step S204, the sine function lookup table is generated.

65536 points are uniformly sampled within one cycle to be symmetric about a y-axis, and function values are amplified to 4096 times, which are generated through the MATLAB, and are sequentially stored in the file with a coe suffix.

In Step S205, the arctangent function lookup table is generated.

524288 points are uniformly sampled around an origin point with an interval 1/65536 between each sampling point to be symmetric about the y-axis, and function values are amplified to $2^{15}/\pi$ times, which are generated through the MATLAB, and are sequentially stored in the file with a coe suffix.

In Step S3, parameters generated in Step S2 are imported into a hardware simulation platform to calculate the communication channel parameters of the clusters, such as an angle distribution and an amplitude distribution, a Verilog code is written for running, and a channel impulse response of the time-domain non-stationary V2V MIMO communication channel is eventually obtained by calculation.

In this embodiment, Step S3 specifically includes the following steps.

In Step S301, the AoD of all paths and the AoA of all paths are generated.

The calculation formulas of the AoD of all paths and the AoA of all paths are expressed as $$\theta_{AoD}^{LoS}(t) = \arctan\frac{Rx^y(t) - Tx^y(t)}{Rx^x(t) - Tx^x(t)},$$

$$\theta_{AoD}^{LoS}(t) = \arctan\frac{Tx^y(t) - Rx^y(t)}{Tx^x(t) - Rx^x(t)},$$

$$\theta_{AoD}^{i,n}(t) = \arctan\frac{S_{i,n}^y(t) - Tx^y(t)}{S_{i,n}^x(t) - Tx^x(t)},$$

$$\theta_{AoA}^{i,n}(t) = \arctan\frac{S_{i,n}^y(t) - Rx^y(t)}{S_{i,n}^x(t) - Rx^x(t)},$$

where $$S_{i,n}^x(t), Tx^x(t) \text{ and } Rx^x(t)$$

denote a horizontal coordinate of the n-th scatterer in the i-th class(i=1,2,3), a horizontal coordinate of the transmitter, and a horizontal coordinate of the receiver, respectively, and $$S_{i,n}^y(t), Tx^y(t) \text{ and } Rx^y(t)$$

denote a vertical coordinate of the n-th scatterer in the i-th class, a vertical coordinate of the transmitter, and a vertical coordinate of the receiver, respectively.

In Step S302, a sub-path angle of the NLoS path is generated.

The calculation formulas of a sub-path angle of the NLoS path are expressed as $$\theta_{AoD}^{i,n,m}(t) = \varphi_{AoD}^{m}(t) + \theta_{AoD}^{i,n},$$

$$\theta_{AoD}^{i,n,m}(t) = \varphi_{AoA}^{m}(t) + \theta_{AoA}^{i,n},$$

where $$\varphi_{AoD}^{m}(t) \text{ and } \varphi_{AoA}^{m}(t)$$

denote an angle spread value for the AoD of the m-th sub-path and an angle spread value for the AoA of the m-th sub-path, respectively, and $$\theta_{AoD}^{i,n} \text{ and } \theta_{AoA}^{i,n}$$

denote an average value for the AoDs of clusters passing through the n-th scatterer in the i-th class and an average value for the AoAs of the clusters passing through the n-th scatterer in the i-th class, respectively.

In Step S303, a time delay value is generated.

The calculation formula of a time delay value is expressed as $$\tau^{LoS}(t) = \frac{\sqrt{[Rx^x(t) - Tx^x(t)]^2 + [Rx^y(t) - Tx^y(t)]^2}}{c}$$

$$\tau_n^{SB_i}(t) = \frac{\sqrt{\begin{array}{l}[S_{i,n}^x(t) - Tx^x(t)]^2 + [S_{i,n}^y(t) - Tx^y(t)]^2 + \\ [S_{i,n}^x(t) - Rx^x(t)]^2 + [S_{i,n}^y(t) - Rx^y(t)]^2\end{array}}}{c}$$

$$\tau_{n_1,n_2}^{DB}(t) = \frac{\sqrt{\begin{array}{l}[S_{1,n}^x(t) - Tx^x(t)]^2 + [S_{1,n}^y(t) - Tx^y(t)]^2 + \\ [S_{1,n}^x(t) - S_{2,n}^x(t)]^2 + [S_{1,n}^y(t) - \\ S_{2,n}^y(t)]^2 + [S_{2,n}^x(t) - \\ Rx^x(t)]^2 + [S_{2,n}^y(t) - Rx^y(t)]^2\end{array}}}{c}$$

where, $\tau^{LoS}(t)$ denotes a time delay value for a LoS path, $$\tau_n^{SB_i}(t)$$

denotes a time delay value for a SB path cluster passing through the n-th scatterer in the i-th class, $$\tau_{n_1,n_2}^{DB}(t)$$

denotes a time delay value for a DB path cluster passing through the $n_1$-th scatterer in the first class and the $n_2$-th scatterer in the second class, and c denotes a velocity of light.

In Step S304, Doppler phase values are generated.

The calculation formulas of the Doppler phase values are expressed as $$f^{LoS}(t) = f_c \left( \frac{\vec{v}_{Tx}^{T} \hat{r}_{Tx}^{LoS}(t)}{c} + \frac{\vec{v}_{Rx}^{T} \hat{r}_{Rx}^{LoS}(t)}{c} \right),$$

where $f^{LoS}(t)$ denotes a Doppler frequency of the LoS path, $f_c$ denotes a carrier frequency; and $$\hat{r}_{Tx}^{LoS}(t) = \left( \cos\theta_{AoD}^{LoS}(t), \sin\theta_{AoD}^{LoS}(t) \right)$$

$$\hat{r}_{Rx}^{LoS}(t) = \left( \cos\theta_{AoA}^{Los}(t), \sin\theta_{AoA}^{Los}(t) \right)$$

$$\phi^{LoS}(t) = \int_{t_0}^{t} 2\pi f^{LoS}(t')\,dt',$$

where $$\hat{r}_{Tx}^{LoS}(t) \text{ and } \hat{r}_{Rx}^{LoS}(t)$$

denote a unit vector for the AoD of the LoS path and a unit vector for the AoA of the LoS path, respectively, and $\phi^{LoS}(t)$ denotes a Doppler phase of the LoS path; and $$f_{n,m}^{SB_i}(t) = f_c \left( \frac{\vec{v}_{n_i,Tx}^{T} \hat{r}_{Tx,n,m}^{SB}(t)}{c} + \frac{\vec{v}_{n_i,Rx}^{T} \hat{R}_{x,n,m}^{SB}(t)}{c} \right),$$

$$f_{n,m}^{SB_i}(t)$$

denotes a Doppler frequency of the m-th sub-path of the SB path passing through the n-th scatterer in the i-th class, and $\vec{v}_{n_i,Tx} = \vec{v}_{Tx} - \vec{v}_{n_i}$ $$\vec{v}_{n_i,Rx} = \vec{v}_{Rx} - \vec{v}_{n_i}$$

$$\hat{r}_{Tx,n,m}^{SB_i}(t) = \left( \cos\theta_{AoD}^{i,n,m}(t), \sin\theta_{AoD}^{i,n,m}(t) \right)$$

$$\hat{r}_{Rx,n,m}^{SB_i}(t) = \left( \cos\theta_{AoA}^{i,n,m}(t), \sin\theta_{AoA}^{i,n,m}(t) \right)$$

$$\phi_{n,m}^{SB_i}(t) = \int_{t_0}^{t} 2\pi f_{n,m}^{SB_i}(t')\,dt',$$

where $\vec{v}_{n_i,Tx}$ and $\vec{v}_{n_i,Rx}$ denote a relative velocity of the transmitter with a n-th scatterer and a relative velocity of the receiver with the n-th scatterer, respectively;

$$\hat{r}_{Tx,n,m}^{SB_i}(t) \text{ and } \hat{r}_{Rx,n,m}^{SB_i}(t)$$

denote a unit vector for an AoD of the m-th sub-path of the SB path passing through the n-th scatterer in the i-th class, and a unit vector for an AoA of the m-th sub-path of the SB path passing through the n-th scatterer in the i-th class, respectively, and $$\phi_{n,m}^{SB_i}(t)$$

denotes a Doppler phase of the m-th sub-path of the SB path passing through the n-th scatterer in the i-th class;

$$f_{n_1,n_2,m}^{DB}(t) = f_c \left( \frac{\vec{v}_{n_1,Tx}^{\ T} \hat{r}_{Tx,n_1,m}^{DB}(t)}{c} + \frac{\vec{v}_{n_i Rx}^{\ T} \hat{r}_{x,n_2,m}^{DB}(t)}{c} \right),$$

where $$f_{n_1,n_2,m}^{DB}(t)$$

denotes a Doppler frequency of the m-th sub-path of the DB path cluster passing through the $n_1$-th scatterer in the first class and the $n_2$-th scatterer in the second class; and $$\vec{v}_{n_1,Tx} = \vec{v}_{Tx} - \vec{v}_{n_1}$$

$$\vec{v}_{n_2,Rx} = \vec{v}_{Rx} - \vec{v}_{n_2}$$

$$\hat{r}_{Tx,n_1,m}^{DB}(t) = \left( \cos\theta_{AoD}^{1,n_1,m}(t), \sin\theta_{AoD}^{1,n_1,m}(t) \right)$$

$$\hat{r}_{Rx,n_2,m}^{DB}(t) = \left( \cos\theta_{AoA}^{2,n_2,m}(t), \sin\theta_{AoA}^{2,n_2,m}(t) \right)$$

$$\phi_{n_1,n_2,m}^{DB}(t) = \int_{t_0}^{t} 2\pi f_{n_1,n_2,m}^{DB}(t')\, dt',$$

where $$\hat{r}_{Tx,n_1,m}^{DB}(t),\ \text{and}\ \hat{r}_{Rx,n_2,m}^{DB}(t)$$

denote a unit vector for an AoD of the m-th sub-path of a cluster of the DB path passing through the $n_1$-th scatterer in the first class and the $n_2$-th scatterer in the second class, and a unit vector for an AoA of the m-th sub-path of the cluster of the DB path passing through the $n_1$-th scatterer in the first class and the $n_2$-th scatterer in the second class, respectively, and $$\phi_{n_1,n_2,m}^{DB}(t)$$

denotes a Doppler phase of the m-th sub-path of the cluster of the DB path cluster passing through the $n_1$-th scatterer in the first class and the $n_2$-th scatterer in the second class.

In Step S305, an antenna phase value is generated.

The calculation formula of the antenna phase value is expressed as follows.

A relative coordinate $\vec{d}_{Tx}$ of a transmitter antenna is:

$$\vec{d}_{Tx} = [d_{Tx}^x, d_{Tx}^y]^T,$$

where $$d_{Tx}^x$$

denotes a horizontal ordinate of $$\vec{d}_{Tx}\ \text{and}\ d_{Tx}^y$$

denotes a vertical ordinate of $\vec{d}_{Tx}$.

A phase difference $\psi_{Tx}(t)$ of the transmitter antenna is:

$$\psi_{Tx}(t) = 2\pi f_c \frac{\hat{r}_{Tx}^{\ T}(t) \cdot \vec{d}_{Tx}}{c},$$

where $\hat{r}_{Tx}(t)$ denotes a unit vector of an AoD at the time instant t.

A relative coordinate $$\vec{d}_{Rx}$$

of the receiver antenna i:

$$\vec{d}_{Rx} = [d_{Rx}^x, d_{Rx}^y]^T,$$

where $$d_{Rx}^x$$

denotes a horizontal ordinate of $$\vec{d}_{Rx}, d_{Rx}^y$$

denotes a vertical ordinate of $$\vec{d}_{Rx}$$

A phase difference $\psi_{Tx}(t)$ of the receiver antenna is:

$$\psi_{Rx}(t) = 2\pi f_c \frac{\hat{r}_{Rx}^{\ T}(t) \cdot \vec{d}_{Rx}}{c},$$

where $\hat{r}_{Rx}(t)$ denotes a unit vector for an AoA at the time instant t.

The calculation formula of the total antenna phase value $\psi(t)$ is expressed as:

$$\psi(t) = \psi_{Tx}(t) + \psi_{Rx}(t).$$

In Step S306, amplitude values are generated.

The calculation formulas of the amplitude values are expressed as:

$$H^{LoS}(t) = \sqrt{\frac{K_{qp}P_{qp}}{K_{qp}+1}}$$

$$H^{SB_i}(t) = \sqrt{\frac{\xi_{SB_i}P_{qp}}{(K_{qp}+1)N_i(t)M}}$$

-continued $$H_{qp}^{DB}(t) = \sqrt{\frac{\xi_{DB}P_{qp}}{(K_{qp}+1)N_1(t)N_2(t)M}},$$

where, $$H_{qp}^{LoS}(t)$$

denotes channel impulse response amplitude value for a LoS path between the q-th receiving antenna and the p-th transmitting antenna, $$H_{qp}^{SB_i}(t)$$

denotes a channel impulse response amplitude value for a sub-path of a SB path passing through the scatterer in the i-th class located between the q-th receiving antenna and the p-th transmitting antenna, $$H_{qp}^{DB}(t)$$

denotes a channel impulse response amplitude value for the sub-path of the DB path between the q-th receiving antenna and the p-th transmitting antenna, $K_{qp}$ denotes a Rice factor of a p-q link, $P_{qp}$ denotes a total power of the p-q link, $\xi_{SB_i}$ and $\xi_{SB_i}$ denote the proportion of the total scattering power of the SB ray and the DB ray on the NLoS path, respectively, $N_i(t)$ denotes the number of the scatterer in the i-th class at the time instant t, and M denotes the number of the sub-paths in each cluster of the NLoS path.

$K_{qp}$, $\xi_{SB_i}$ and $\xi_{DB}$ in the model are related to the macro cells, the micro cells, and the micro micro cells, as well as a SB path and a DB path. The model proposed by the present disclosure can adapt to various V2V propagation environments by adjusting the model parameters $\xi_{SB_i}$, $\xi_{DB}$ and the Rice factor $K_{qp}$. In the macro cell scenarios, due to a relative large distance between the transmitter and the receiver, the DB rays carry more energy than that of the SB rays(the relative large distance between the transmitter and the receiver leads to a greater independence of an AoD and an AoA, that is, $\xi_{DB}>\max\{\xi_{SB_1},\xi_{SB_2}\}>>\xi_{SB_3}$, and the received signal power mainly comes from the SB rays and the DB rays of the dual loop model. Therefore, the Rice factor $K_{qp}$ and the energy parameter $\xi_{SB_3}$ are extremely little, even close to zero. This means that in the macro cell scenario, it can be characterized by using a dual loop model that ignores the LoS radial component. Compared with the macro cell scenario, in the micro cell scenario and the micro-micro cell scenario, VTD significantly affects the channel characteristics. In consideration of the impacts of VTD on channel statistics, the present disclosure distinguishes the mobile cars and the stationary roadside environments(such as buildings, trees, parked cars, etc.)around the transmitter and the receiver. Therefore, the present disclosure simulates a mobile car by using a dual loop model and describes a stationary roadside environment by using an elliptical model. For low VTD, since the LoS path has a high power, the value for $K_{qp}$ is large. In addition, the received scattering power mainly comes from the signal reflected by the stationary roadside environment described by the scatterers freely located on the ellipse. Since the mobile car represented by the scatterers located on the dual loop is sparse, it is more likely to be a SB rather than a DB, indicating a validity of $\xi_{SB_3}>\max\{\xi_{SB_1},\xi_{SB_2}\}>\xi_{DB}$ is. Under a condition of a high VTD, the value for $K_{qp}$ is smaller than that in a low VTD scenario, and due to the relative large number of the mobile cars, the DB rays of the dual loop model carry more energy than those of the SB rays of the dual loop model and the elliptical model, that is, $\xi_{DB}>\max \{\xi_{SB_1},\xi_{SB_2},\xi_{SB_3}\}$. Thus, the micro cell scenario and the micro-micro cell scenario in consideration of VTD can be well characterized by utilizing the combined dual loop model and the elliptical model with a LoS radial component.

In Step S307, channel impulse response is generated.

The calculation formula of the channel impulse response is expressed as $$h_{qp}^{LoS}(t,\tau) = H^{LoS}(t)e^{-j2\pi f_c \tau^{LoS}(t)}e^{j\phi^{LoS}(t)}e^{j\psi^{LoS}(t)}\delta(\tau - \tau^{LoS}(t))$$

$$h_{qp}^{SB}(t,\tau) = \sum_{i=1}^{3}\sum_{n_i=1}^{N_i(t)} H^{SB_i}(t)e^{-j2\pi f_c \tau_n^{SB_i}(t)}e^{j\varphi_{n,m}^{SB_i}(t)}e^{j\phi_{n,m}^{SB_i}(t)}e^{j\psi_{n,m}^{SB_i}(t)}\delta(\tau - \tau_n^{SB_i}(t))$$

$$h_{qp}^{DB}(t,\tau) = \sum_{n_1,n_2=1}^{N_1(t),N_2(t)} H_{n_1,n_2,m}^{DB}(t)$$

$$e^{-j2\pi f_c \tau_{n_1,n_2}^{DB}(t)}e^{j\varphi_{n_1,n_2,m}^{DB}(t)}e^{j\phi_{n_1,n_2,m}^{DB}(t)}e^{j\psi_{n_1,n_2,m}^{DB}(t)}\delta(\tau - \tau_{n_1,n_2}^{DB}(t))$$

$$h_{qp}(t,\tau) = h_{qp}^{LoS}(t,\tau) + h_{qp}^{SB}(t,\tau) + h_{qp}^{DB}(t,\tau),$$

where $$h_{qp}^{LoS}(t,\tau)$$

denotes a channel impulse response for the LoS path between the q-th receiving antenna and the p-th transmitting antenna, $$h_{qp}^{SB}(t,\tau)$$

denotes the channel impulse response for the SB path between the q-th receiving antenna and the p-th transmitting antenna, $$h_{qp}^{DB}(t,\tau)$$

is a channel impulse response for the DB path between the q-th receiving antenna and the p-th transmitting antenna, $f_c$ denotes a carrier center frequency, $\tau$ denotes a time delay, $\phi$ denotes a Doppler phase, $\psi$ denotes an antenna phase difference, $$\varphi_{n,m}^{SB_i}(t) \text{ and } \varphi_{n_1,n_2,m}^{DB}(t)$$

denote a random phase of the m-th SB sub-path passing through the n-th scatterer in the i-th class and a random phase of a m-th SB sub-path passing through the $n_1$-th scatterer in the first class and the $n_2$-th scatterer in the second class, respectively; the channel impulse response is imported from the file with a coe suffix and a calculated channel impulse response is exported to a txt file.

In Step S4, a comparison is performed with a statistical characteristic of a theoretical communication channel model, and an appropriate hardware diagram of a communication channel emulator is designed.

Figure 3:
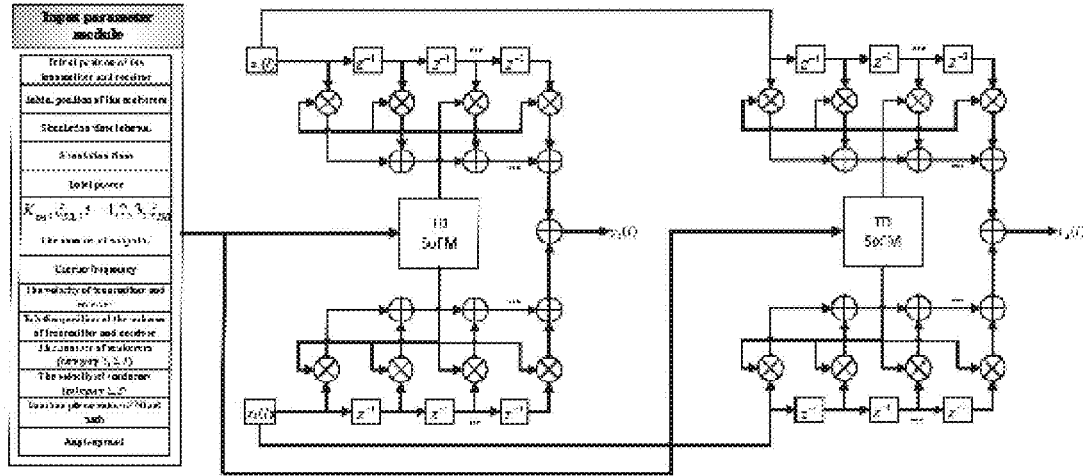
FIG. 3 illustrates a schematic diagram of a hardware block diagram of a time-domain non-stationary V2V MIMO communication channel emulator provided in Embodiment 1 of the present disclosure.
Figure 4:
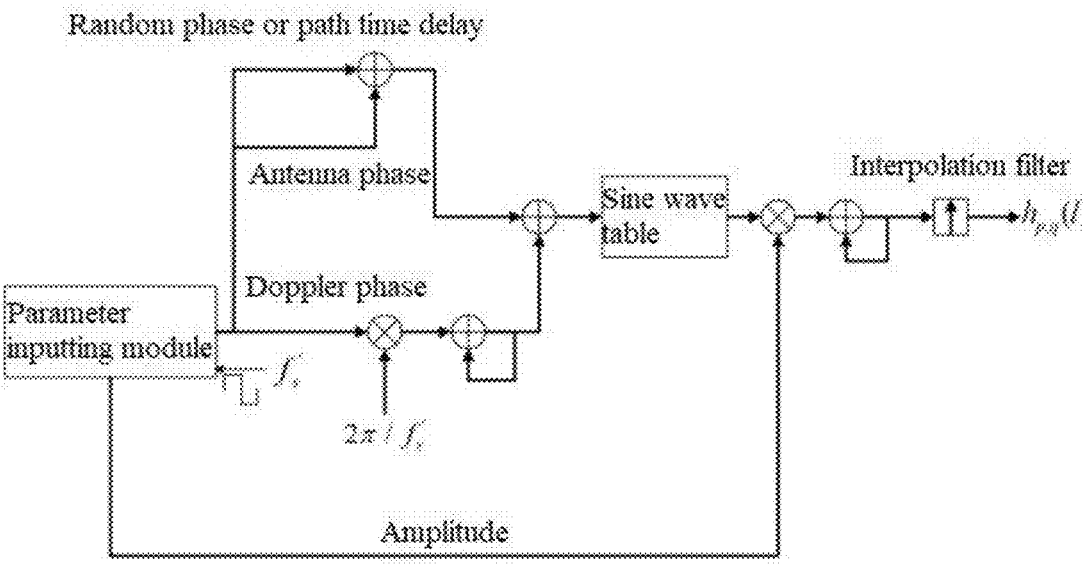
FIG. 4 illustrates a schematic diagram of a TD sum-of-frequency-modulation(SoFM) module in a hardware block diagram of a time-domain non-stationary V2V MIMO communication channel emulator provided in the Embodiment 1 of the present disclosure.

The specific hardware block diagram is illustrated in FIGS. 3 and 4. In this embodiment, Step 4 specifically includes the following steps.

In Step S401, a calculation formula of a time autocorrelation function TACF curve is expressed as:

$$r_{qp,q'p'} = E\{h_{qp}(t, \tau)[h_{q'p'}(t, \tau)]^*\},$$

where $h_{qp}(t,\tau)$ denotes a channel impulse response between the q-th receiving antenna and the p-th transmitting antenna in a case where a time period is t and a time delay is $\tau$, $h_{q'p'}(t,\tau)$ denotes a channel impulse response between the q'-th receiving antenna and the p'-th transmitting antenna in a case where a time period is t and a time delay is $\tau$; $(\cdot)^*$ denotes a conjugate complex of $(\cdot)$.

In Step S402, a calculation formula of a SCCF curve is expressed as $$r_{qp}(\Delta t) = E\{h_{qp}(t, \tau)[h_{qp}(t + \Delta t, \tau)]^*\}.$$

In Step S403, a calculation formula of a delay PSD curve is expressed as $$\rho\left(\tau, \theta_{AoA}^{i,n}\right) = \|h_{qp}(t, \tau)\|^2 \big|_{\theta_{AoA}^{i,n}} .$$

In order to verify the correctness of the method provided in this embodiment, experiments are conducted, and specifically lie as follows.

Figure 5:
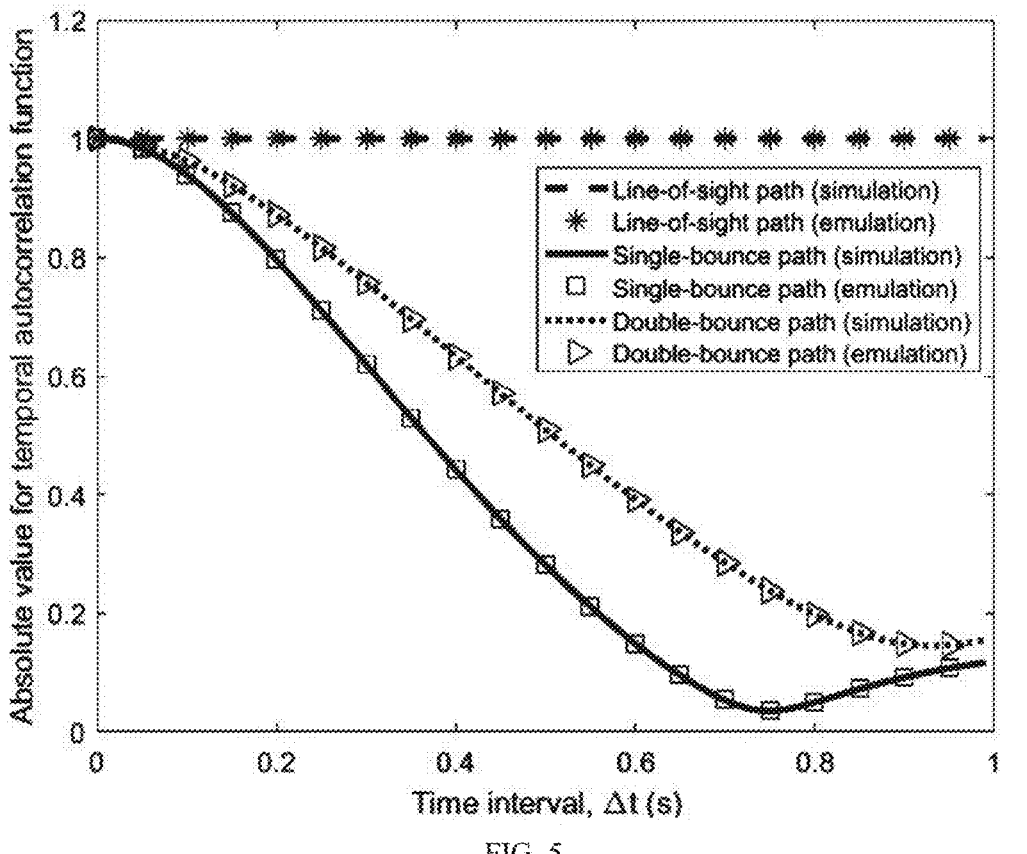
FIG. 5 illustrates a schematic diagram of TACF verification results provided in the Embodiment 1 of the present disclosure, where $f_c$=500 MHZ, $K_{qp}$=1, $\xi_{SB_i}$=0.2, i=1, 2, 3, $\xi_{DB}$=0.4, $P_{qp}$=30 dBm, M=8, $\vec{v}_{Tx}$=(10,0), $\vec{v}_{Rx}$=(5,0)and $\vec{v}_{S_{1(2)}}$=(1,0).

The TACF between the transmitting antenna and the receiving antenna at different time intervals are verified, and the results are as illustrated in FIG. 5. As the time interval increases, the TACF of the NLoS path is a constant, while the TACF of the SB path and DB path decrease with the increase of the time intervals. And the reason of that is that the time changes cause the changes on the angular distributions of sub-path and the Doppler phase.

Figure 6:
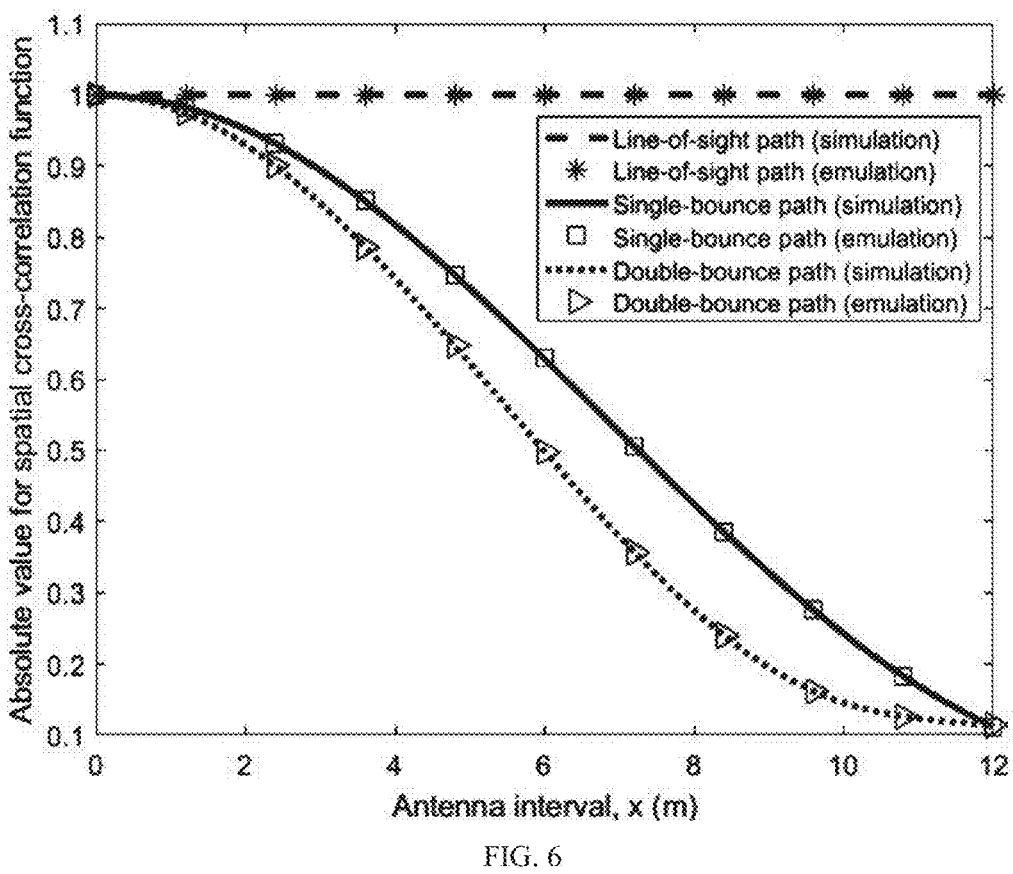
FIG. 6 illustrates a schematic diagram of SCCF verification results provided in the Embodiment 1 of the present disclosure, where $f_c$=500 MHZ, $K_{qp}$=1, $\xi_{SB_i}$=0.2, i=1, 2, 3, $\xi_{DB}$=0.4, $P_{qp}$=30 dBm, M=8, $\vec{v}_{Tx}$=(10,0), $\vec{v}_{Rx}$=(5,0)and $\vec{v}_{S_{1(2)}}$=(1,0).

The SCCF between the receiving antennas at different antenna intervals are verified, and the results are as illustrated in FIG. 6. As the antenna interval increases, the SCCF of the NLoS path is a constant, while the SCCF of the SB path and DB path decrease with the increase of the antenna intervals. And the reason of that is that the changes in antenna intervals cause changes on the phase differences of the antenna array in the sub-path.

Figure 7:
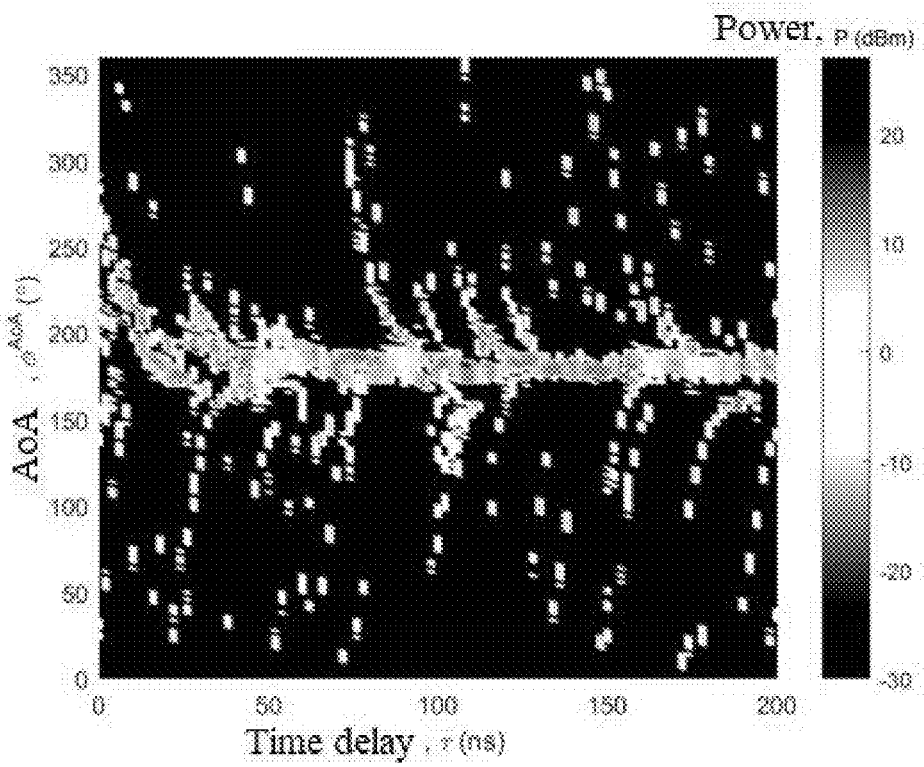
FIG. 7 illustrates a schematic diagram of SCCF simulation results provided in the Embodiment 1 of the present disclosure, where $f_c$=500 MHZ, $K_{qp}$=1, $\xi_{SB_i}$=0.2, i=1, 2, 3, $\xi_{DB}$=0.4, $P_{qp}$=30 dBm, M=8, $\vec{v}_{Tx}$=(10,0), $\vec{v}_{Rx}$=(5,0)and $\vec{v}_{S_{1(2)}}$=(1,0), $\gamma_G$=0.08/m, $\gamma_R$=0.03/m, and $P_m$=0.6.
Figure 8:
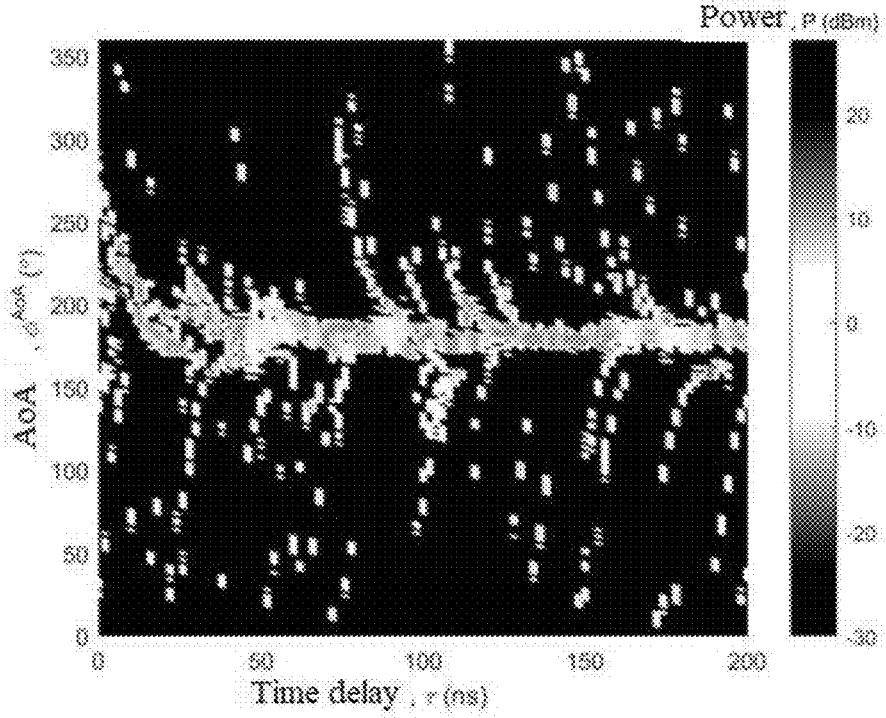
FIG. 8 illustrates a schematic diagram of simulation results for delayed PSD hardware platform provided in the Embodiment 1 of the present disclosure, where $f_c$=500

The delay PSD of channel impulse response at different antenna intervals are verified, and the results are as illustrated in FIG. 7 and FIG. 8. Observing the drawings, the hardware simulation results match well with the MATLAB simulation results. The coherent lines in FIG. 7 and FIG. 8 represent the delay PSD of the channel impulse response of cluster passing through the scatterers in the first class in LoS path and SB path. This is because the scatterers in the first class is relative closer to the transmitter and relative farther from the receiver. Therefore, even if one part of the scatterers in the first class is generated or disappears, the AoA is basically the same as the angle from the transmitter to the receiver. The other scatter points in FIG. 7 and FIG. 8 indicate that as the time delay increases, the clusters of other NLoS paths are generating or disappearing. It can be seen from the delay PSD drawings, this embodiment has a characteristics of birth-death process of clusters in time-domain, which is an important characteristic of time-domain non-stationary communication channels.

In summary, provided in the present disclosure is a method for designing a time-domain non-stationary V2V MIMO communication channel emulator, which can describe the fading characteristics of macro cell, micro cell, and micro-micro cell, as well as the birth and death process of the clusters. The statistical characteristics of the simulations have important reference value for the designs of time-domain non-stationary communication channel emulators.

The unspecified parts in the present disclosure are all the common sense for a person skilled in the art. The preferred specific embodiments of the present disclosure are described in details in above. It should be understood that various amendments and changes can be made by an ordinary person skilled in the art according to the concept of the present disclosure with no creative efforts. Therefore, all technical solutions that can be obtained by a person skilled in the art on a basis of the prior art according to the concept of the present disclosure through the logical analysis, reasoning, or limited experiments should be within the protection scope determined by the claims.

What is claimed is:

1. A method for designing a time-domain non-stationary vehicle-to-vehicle (V2V) multiple-input multiple-output (MIMO) communication channel emulator, wherein the method comprises following steps:

Step S1, determining basic parameters for the V2V MIMO communication channel;

Step S2, generating, by using a MATLAB program, a V2V two-dimensional (2D) time-domain non-stationary communication channel environment, specifically including: a number of scatterers and positions of the scatterers, a random phase of a non-line-of-sight (NLoS) path, an angle spread of the NLOS path, a sine function lookup table, and an arctangent function lookup table;

Step S3, importing parameters generated in Step S2 into a hardware simulation platform to calculate communication channel parameters for clusters, wherein the communication channel parameters include an angle distribution and an amplitude distribution, writing a Verilog code for running, and eventually calculating to obtain a channel impulse response of the time-domain non-stationary V2V MIMO communication channel; and Step S4, comparing with a statistical characteristic of a theoretical communication channel model, and designing an appropriate hardware diagram of the V2V MIMO communication channel emulator.

2. The method for designing the time-domain non-stationary V2V MIMO communication channel emulator according to claim 1, wherein in Step S1, in a geometry-based stochastic model for the time-domain non-stationary V2V MIMO communication channel, the basic parameters for the V2V MIMO communication channel include a number of a simulation time point, a simulation time interval, a position of a transmitter, a position of a receiver, a velocity of the transmitter, a velocity of the receiver, a Rice factor, an angle spread coefficient, a total link power, a line-of-sight (LoS) path, a power ratio of a single-bounce (SB) path, a power ratio of a double-bounce (DB) path, a number of initial scatterers, a velocity of the initial scatterers, a number of sub-paths in each cluster, a generation rate for scatterers, a disappearance rate for the scatterers, a motion ratio of the scatterers, a relative coordinate of a receiver antenna and a relative coordinate of a transmitter antenna.

3. The method for designing the time-domain non-stationary V2V MIMO communication channel emulator according to claim 1, wherein Step S2 specifically includes:

Step S201, generating the numbers of the scatterers and the positions of the scatterers, and expressing an average survival probability Premain of effective scatterers within a time period $\Delta t$ as $$P_{remain} = \exp\{-\gamma_R[P_m(\|\vec{v}_{S_1}\| + \|\vec{v}_{S_2}\|)\Delta t + \|\vec{v}_{Rx} - \vec{v}_{Tx}\|\Delta t]\},$$

where $\gamma_R$ denotes a generation rate of the scatterers, $P_m$ denotes a motion percentage, $\vec{v}_{S_1}$, and $\vec{v}_{S_2}$ denote an average velocity of scatterers $S_1$ and an average velocity of scatterers $S_2$, respectively, $\vec{v}_{Tx}$ and $\vec{v}_{Rx}$ denote a velocity of a transmitter and a velocity of a receiver, respectively;

denoting a probability function $P(N_{new}(\Delta t)=k)$ of a number of newly generated scatterers as $$P(N_{new}(\Delta t) = k) = \frac{\lambda^k}{k!}e^{-\lambda}, k = 0, 1, \dots, \text{ and}$$

$$\lambda = \frac{\gamma_G}{\gamma_R}(1 - P_{remain}),$$

where $\lambda$ denotes a parameter for a Poisson distribution probability distribution function;

$\gamma_G$ denotes a disappearance rate of the scatterers, k denotes a parameter; then, an average number of the scatterers E{N(t)} is:

$$E\{N(t)\} = \frac{\gamma_G}{\gamma_R},$$

eventually calculating to obtain a number of the scatterers within each time period $\Delta t$, and generating, through a MATLAB program, the numbers of the scatterers within each time period $\Delta t$, and sequentially storing the number in a file with a coe suffix;

uniformly and randomly generating, in a rectangular area around the receiver and the transmitter, position coordinates of the scatterers; and generating, through the MATLAB program, the position coordinates of the scatterers, and sequentially storing the position coordinates in the file with the coe suffix;

Step S202, generating the random phase of a NLoS path, wherein the random phase of the NLoS path follows a uniform distribution in $[-\pi,\pi)$, and generating, through the MATLAB program, the random phase of the NLoS path, and sequentially storing the random phase in the file with the coe suffix;

Step S203, generating the angle spread of the NLoS path, and expressing a calculation formula as $$\varphi_{AoD}^m(t) = AS(\theta_{AoD})Y_{AoD}^m,$$

$$\varphi_{AoA}^m(t) = AS(\theta_{AoA})Y_{AoA}^m,$$

where $$\varphi_{AoD}^m(t) \text{ and } \varphi_{AoA}^m(t)$$

denote an angle spread of an AoD and an angle spread of an angle of arrival AoA, respectively, $AS(\theta_{AoD})$ and $AS(\theta_{AoA})$ denote an angle spread coefficient for the AoD and an angle spread coefficient for the AoA, respectively, and $$Y_{AoD}^m \text{ and } Y_{AoA}^m$$

follow a standard normal distribution N(0,1), respectively, and generating, through the MATLAB program, the angle spread of the AoD and the angle spread of the AoA, and sequentially storing the angle spread of the AoD and the angle spread of the AoA in the file with the coe suffix;

Step S204, generating the sine function lookup table, uniformly sampling 65536 points within one cycle to be symmetric about a y-axis, amplifying function values to 4096 times, generating, through the MATLAB program, the sine function lookup table, and sequentially storing the table in the file with the coe suffix; and Step S205, generating the arctangent function lookup table, uniformly sampling 524288 points around an origin point with an interval $$\frac{1}{65536}$$

between each sampling point to be symmetric about the y-axis, amplifying function values to $$\frac{2^{15}}{\pi}$$

times, generating, through the program MATLAB program, the arctangent function lookup table, and sequentially storing the table in the file with the coe suffix.

4. The method for designing the time-domain non-stationary V2V MIMO communication channel emulator according to claim 1, wherein in Step S3, the angle distributions of the clusters are expressed as $$\theta_{AoD}^{LoS}(t), \theta_{AoA}^{LoS}(t), \theta_{AoD}^{i,n}(t) \text{ and } \theta_{AoA}^{i,n}(t),$$

the amplitude distribution is expressed as $$H_{qp}^{LoS}(t), H_{qp}^{SB_i}(t) \text{ and } H_{qp}^{DB}(t);$$

wherein an angle of the clusters is determined by a coordinate of a transmitter, a coordinate of a receiver, and the coordinates of the scatterers; an amplitude is determined by a Rice factor, the total power, a proportion of a single-bound (SB) ray and a double-bounce (DB) ray to a total scattering power on a non-line-of-sight (NLoS) paths, a number of an i-th class scatterers at a time instant t, and the number of sub-paths in each cluster of the NLoS path, Step S3 specifically includes:

Step S301, generating the angle of departure (AoD) of all paths and the angle of arrival (AoA) of all paths, and expressing calculation formulas of the AoD and the AoA as $$\theta_{AoD}^{LoS}(t) = \arctan \frac{Rx^y(t) - Tx^y(t)}{Rx^x(t) - Tx^x(t)},$$

$$\theta_{AoA}^{LoS}(t) = \arctan \frac{Tx^y(t) - Rx^y(t)}{Tx^x(t) - Rx^x(t)},$$

$$\theta_{AoD}^{i,n}(t) = \arctan \frac{S_{i,n}^y(t) - Tx^y(t)}{S_{i,n}^x(t) - Tx^x(t)},$$

$$\theta_{AoA}^{i,n}(t) = \arctan \frac{S_{i,n}^y(t) - Rx^y(t)}{S_{i,n}^x(t) - Rx^x(t)},$$

where $$S_{i,n}^x(t), \ Tx^x(t) \text{ and } Rx^x(t)$$

denote a horizontal coordinate of a n-th scatterer in an i-th class(i=1,2,3), a horizontal coordinate of the transmitter, and a horizontal coordinate of the receiver, respectively, and $$S_{i,n}^y(t), \ Tx^y(t) \text{ and } Rx^y(t)$$

denote a vertical coordinate of the n-th scatterer in the i-th class, a vertical coordinate of the transmitter, and a vertical coordinate of the receiver, respectively;

Step S302, generating a sub-path angle of the NLoS path, and expressing calculation formulas of the sub-path angle as $$\theta_{AoD}^{i,n,m}(t) = \varphi_{AoD}^m(t) + \theta_{AoD}^{i,n},$$

$$\theta_{AoA}^{i,n,m}(t) = \varphi_{AoA}^m(t) + \theta_{AoA}^{i,n},$$

where $$\theta_{AoD}^{i,n,m}(t) \text{ and } \theta_{AoA}^{i,n,m}(t)$$

denote an AoD of an m-th sub-path and an AoA of an m-th sub-path, respectively, $$\varphi_{AoD}^m(t) \text{ and } \varphi_{AoA}^m(t)$$

denote an angle spread value for the AoD of the m-th sub-path and an angle spread value for the AoA of the m-th sub-path, respectively, and $$\theta_{AoD}^{i,n} \text{ and } \theta_{AoA}^{i,n}$$

denote an average value for AoDs of clusters passing though the n-th scatterer in the i-th class and an average value for AoAs of the clusters passing though the n-th scatterer in the i-th class, respectively;

Step S303, generating a time delay value, and expressing calculation formulas of the time delay value as:

$$\tau^{LoS}(t) = \frac{\sqrt{[Rx^x(t) - Tx^x(t)]^2 + [Rx^y(t) - Tx^y(t)]^2}}{c}$$

$$\tau_n^{SB_i}(t) = \frac{\sqrt{\begin{array}{l}[S_{i,n}^x(t) - Tx^x(t)]^2 + [S_{i,n}^y(t) - Tx^y(t)]^2 + \\ [S_{i,n}^x(t) - Rx^x(t)]^2 + [S_{i,n}^y(t) - Rx^y(t)]^2\end{array}}}{c}$$

$$\tau_{n_1,n_2}^{DB}(t) = \frac{\sqrt{\begin{array}{l}[S_{1,n}^x(t) - Tx^x(t)]^2 + [S_{1,n}^y(t) - Tx^y(t)]^2 + [S_{1,n}^x(t) - S_{2,n}^x(t)]^2 + \\ [S_{1,n}^y(t) - S_{2,n}^y(t)]^2 + [S_{2,n}^x(t) - Rx^x(t)]^2 + [S_{2,n}^y(t) - Rx^y(t)]^2\end{array}}}{c}$$

where, $\tau^{LoS}(t)$ denotes a time delay value for a LoS path, $$\tau_n^{SB_i}(t)$$

denotes a time delay value for a SB path cluster passing through the n-th scatterer in the i-th class, $$\tau_{n_1,n_2}^{DB}(t)$$

denotes a time delay value for a DB path cluster passing through a $n_1$-th scatterer in the first class and a $n_2$-th scatterer in the second class, and c denotes a velocity of light;

Step S304, generating Doppler phase values of $$\phi^{LoS}(t), \ \phi_{n,m}^{SB_i}(t) \text{ and } \phi_{n_1,n_2,m}^{DB}(t),$$

and expressing calculation formulas of the Doppler phase values as $$f^{LoS}(t) = f_c \left( \frac{\vec{v}_{Tx}^T \hat{r}_{Tx}^{LoS}(t)}{c} + \frac{\vec{v}_{Rx}^T \hat{r}_{Rx}^{LoS}(t)}{c} \right),$$

where $f^{LoS}(t)$ denotes a Doppler frequency of the LoS path, $f_c$ denotes a carrier frequency; and $$\hat{r}_{Tx}^{LoS}(t) = \left( \cos\theta_{AoD}^{Los}(t), \ \sin\theta_{AoD}^{LoS}(t) \right)$$

$$\hat{r}_{Rx}^{LoS}(t) = \left( \cos\theta_{AoA}^{LoS}(t), \ \sin\theta_{AoA}^{LoS}(t) \right)$$

$$\phi^{LoS}(t) = \int_{t_0}^t 2\pi f^{LoS}(t')dt',$$

where $$\hat{r}_{Tx}^{LoS}(t) \text{ and } \hat{r}_{Rx}^{LoS}(t)$$

denote a unit vector for the AoD of the LoS path and a unit vector for the AoA of the LoS path, respectively, and $\phi^{LoS}(t)$ denotes a Doppler phase of the LoS path; and $$f_{n,m}^{SB_i}(t) = f_c\left(\frac{\vec{v}_{n_i,Tx}^T \hat{r}_{Tx,n,m}^{SB}(t)}{c} + \frac{\vec{v}_{n_i,Rx}^T \hat{r}_{Tx,n,m}^{SB}(t)}{c}\right),$$

where $$f_{n,m}^{SB_i}(t)$$

denotes a Doppler frequency of an m-th sub-path of the SB path passing through the n-th scatterer in the i-th class, and $$\vec{v}_{n_i,Rx} = \vec{v}_{Rx} - \vec{v}_{n_i}$$

$$\hat{r}_{Tx,n,m}^{SB_i}(t) = \left(\cos \theta_{AoD}^{i,n,m}(t), \sin \theta_{AoD}^{i,n,m}(t)\right)$$

$$\hat{r}_{Rx,n,m}^{SB_i}(t) = \left(\cos \theta_{AoA}^{i,n,m}(t), \sin \theta_{AoA}^{i,n,m}(t)\right)$$

$$\phi_{n,m}^{SB_i}(t) = \int_{t_0}^{t} 2\pi f_{n,m}^{SB_i}(t')dt',$$

where $\vec{v}_{n_i,Tx}$ and $\vec{v}_{n_i,Rx}$ denote a relative velocity of the transmitter with a n-th scatterer and a relative velocity of the receiver with the n-th scatterer, respectively;

$$\hat{r}_{Tx,n,m}^{SB_i}(t) \text{ and } \hat{r}_{Rx,n,m}^{SB_i}(t)$$

denote a unit vector for an AoD of the m-th sub-path of the SB path passing through the n-th scatterer in the i-th class, and a unit vector for an AoA of the m-th sub-path of the SB path passing through the n-th scatterer in the i-th class, respectively, and $$\phi_{n,m}^{SB_i}(t)$$

denotes a Doppler phase of the m-th sub-path of the SB path passing through the n-th scatterer in the i-th class;

$$f_{n_1,n_2,m}^{DB}(t) = f_c\left(\frac{\vec{v}_{n_1,Tx}^T \hat{r}_{Tx,n_1,m}^{DB}(t)}{c} + \frac{\vec{v}_{n_2,Rx}^T \hat{r}_{Rx,n_2,m}^{DB}(t)}{c}\right),$$

where $$f_{n_1,n_2,m}^{DB}(t)$$

denotes a Doppler frequency of a m-th sub-path of the DB path passing through a $n_1$-th scatterer in the first class and a $n_2$-th scatterer in the second class; and $$\vec{v}_{n_1,Tx} = \vec{v}_{Tx} - \vec{v}_{n_1}$$

$$\vec{v}_{n_2,Rx} = \vec{v}_{Rx} - \vec{v}_{n_2}$$

$$\hat{r}_{Tx,n_1,m}^{DB}(t) = \left(\cos \theta_{AoD}^{1,n_1,m}(t), \sin \theta_{AoD}^{1,n_1,m}(t)\right)$$

$$\hat{r}_{Rx,n_2,m}^{DB}(t) = \left(\cos \theta_{AoA}^{2,n_2,m}(t), \sin \theta_{AoA}^{2,n_2,m}(t)\right)$$

$$\phi_{n_1,n_2,m}^{DB}(t) = \int_{t_0}^{t} 2\pi f_{n_1,n_2,m}^{DB}(t')dt',$$

where $$\hat{r}_{Tx,n_1,m}^{DB}(t) \text{ and } \hat{r}_{Rx,n_2,m}^{DB}(t)$$

denote a unit vector for an AoD of the m-th sub-path of a cluster of the DB path passing through the $n_1$-th scatterer in the first class and the $n_2$-th scatterer in the second class, and a unit vector for an AoA of the m-th sub-path of the cluster of the DB path passing through the $n_1$-th scatterer in the first class and the $n_2$-th scatterer in the second class, respectively, and $$\phi_{n_1,n_2,m}^{DB}(t)$$

denotes a Doppler phase of the m-th sub-path of the cluster of the DB path passing through the $n_1$-th scatterer in the first class and the $n_2$-th scatterer in the second class;

Step S305, generating an antenna phase value, and expressing a calculation formula of the antenna phase value as:

a relative coordinate $\vec{d}_{Tx}$ of a transmitter antenna being:

$$\vec{d}_{Tx} = [d_{Tx}^x, d_{Tx}^y]^T,$$

where $$d_{Tx}^x$$

denotes a horizontal ordinate of $$\vec{d}_{Tx} \text{ and } d_{Tx}^y$$

denotes a vertical ordinate of $\vec{d}_{Tx}$;

a phase difference $\psi_{Tx}(t)$ of the transmitter antenna being:

$$\psi_{Tx}(t) = 2\pi f_c \frac{\hat{r}_{Tx}^T(t) \cdot \vec{d}_{Tx}}{c},$$

where $\hat{r}_{Tx}(t)$ denotes a unit vector for an AoD at the time instant t;

a relative coordinate $\vec{d}_{Rx}$ of the receiver antenna being:

$$\vec{d}_{Rx} = [d_{Rx}^x, d_{Rx}^y]^T,$$

where $$d_{Rx}^x$$

denotes a horizontal ordinate of $$\vec{d}_{Rx}, d_{Rx}^y$$

denotes a vertical ordinate of $\vec{d}_{Rx}$, a phase difference $\psi_{Rx}(t)$ of the receiver antenna being:

$$\psi_{Rx}(t) = 2\pi f_c \frac{\hat{r}_{rx}^T(t) \cdot \vec{d}_{Rx}}{c},$$

where $\hat{r}_{Rx}(t)$ denotes a unit vector for an AoA at the time instant t; and a total antenna phase value $\psi(t)$ being:

$$\psi(t) = \psi_{Tx}(t) + \psi_{Rx}(t);$$

Step S306, generating amplitude values, expressing calculation formulas of the amplitude values as:

$$H^{LoS}(t) = \sqrt{\frac{K_{qp}P_{qp}}{K_{qp}+1}}$$

$$H^{SB_i}(t) = \sqrt{\frac{\xi_{SB_i}P_{qp}}{(K_{qp}+1)N_i(t)M}}$$

$$H_{qp}^{DB}(t) = \sqrt{\frac{\xi_{DB}P_{qp}}{(K_{qp}+1)N_1(t)N_2(t)M}},$$

where, $$H_{qp}^{LoS}(t)$$

denotes a channel impulse response amplitude value for a LoS path between a q-th receiving antenna and a p-th transmitting antenna, $$H_{qp}^{SB_i}(t)$$

denotes a channel impulse response amplitude value for a sub-path of a SB path passing through the scatterer in the i-th class located between the q-th receiving antenna and the p-th transmitting antenna, $$H_{qp}^{DB}(t)$$

denotes a channel impulse response amplitude value for the sub-path of the DB path between the q-th receiving antenna and the p-th transmitting antenna, $K_{qp}$ denotes a Rice factor of a p-q link, $P_{qp}$ denotes a total power of the p-q link, $\xi_{SB_i}$ and $\xi_{SB_j}$ denote the proportion of the total scattering power of the SB ray and the DB ray on the NLoS path, respectively, $N_i(t)$ denotes a number of the scatterer in the i-th class at the time instant t, and M denotes a number of the sub-paths in each cluster of the NLoS path; and Step S307, generating channel impulse response (CIR), and expressing a calculation formula of the CIR as $$h_{qp}^{LoS}(t, \tau) = H^{LoS}(t)e^{-j2\pi f_c \tau^{LoS}(t)}e^{j\phi^{LoS}(t)}e^{j\psi^{LoS}(t)}\delta\left(\tau - \tau^{LoS}(t)\right)$$

$$h_{qp}^{SB}(t, \tau) = \sum_{i=1}^{3}\sum_{n_i=1}^{N_i(t)} H^{SB_i}(t)e^{-j2\pi f_c \tau_n^{SB_i}(t)}e^{j\varphi_{n,m}^{SB_i}(t)}e^{j\phi_{n,m}^{SB_i}(t)}e^{j\psi_{n,m}^{SB_i}(t)}\delta\left(\tau - \tau_n^{SB_i}(t)\right)$$

$$h_{qp}^{DB}(t, \tau) = \sum_{n_1,n_2=1}^{N_1(t),N_2(t)} H_{n_1,n_2,m}^{HB}(t)$$

$$e^{-j2\pi f_c \tau_{n_1,n_2}^{DB}}e^{j\varphi_{n_1,n_2,m}^{DB}(t)}e^{j\phi_{n_1,n_2,m}^{DB}(t)}e^{j\psi_{n_1,n_2,m}^{DB}(t)}\delta\left(\tau - \tau_{n_1,n_2}^{DB_i}(t)\right)$$

$$h_{qp}(t, \tau) = h_{qp}^{LoS}(t, \tau) + h_{qp}^{SB}(t, \tau) + h_{qp}^{DB}(t, \tau),$$

where $$h_{qp}^{LoS}(t, \tau)$$

denotes a channel impulse response for the LoS path between the q-th receiving antenna and the p-th transmitting antenna, $$h_{qp}^{SB}(t, \tau)$$

denotes the channel impulse response for the SB path between the q-th receiving antenna and the p-th transmitting antenna, $$h_{qp}^{DB}(t, \tau)$$

denotes a channel impulse response for the DB path between the q-th receiving antenna and the p-th transmitting antenna, $f_c$ denotes a carrier center frequency, $\tau$ denotes a time delay, $\phi$ denotes a Doppler phase, $\psi$ denotes an antenna phase difference, $$\varphi_{n,m}^{SB_i}(t) \text{ and } \varphi_{n_1,n_2,m}^{DB}(t)$$

denote a random phase of a m-th SB sub-path passing through the n-th scatterer in the i-th class and a random phase of a m-th SB sub-path passing through the $n_1$-th scatterer in the first class and a $n_2$-th scatterer in the second class, respectively; and importing from the file with a coe suffix and exporting a calculated channel impulse response to a txt file.

5. The method for designing the time-domain non-stationary V2V MIMO communication channel emulator according to claim 1, wherein in Step S4, formulas for the statistical characteristic specifically include:

Step S401, expressing a calculation formula of a time autocorrelation function (TACF) curve as:

$$r_{qp,q'p'} = E\{h_{qp}(t, \tau)[h_{q'p'}(t, \tau)]^*\},$$

where $h_{qp}(t,\tau)$ denotes a channel impulse response between a q-th receiving antenna and a p-th transmitting antenna in a case where a time period is t and a time delay is $\tau$, $h_{q'p'}(t,\tau)$ denotes a channel impulse response between a q'-th receiving antenna and a p'-th transmitting antenna in a case where a time period is t and a time delay is $\tau$;$(\cdot)^*$ denotes a conjugate complex of$(\cdot)$;

Step S402, expressing a calculation formula of a spatial cross-correlation function SCCF curve as $$r_{qp}(\Delta t) = E\{h_{qp}(t, \tau)[h_{qp}(t + \Delta t, \tau)]^*\},$$

Step S403, expressing a calculation formula of a delay power spectral density(PSD)curve as $$\rho(\tau, \theta_{AoA}^{i,n}) = \|h_{qp}(t, \tau)\|^2|_{\theta_{AoA}^{i,n}} \cdot$$

\*    \*    \*    \*    \*